(12) United States Patent
Buckland

(10) Patent No.: US 12,024,979 B2
(45) Date of Patent: Jul. 2, 2024

(54) CIRCULATION VALVE

(71) Applicant: Circulate Plus Limited, Inverurie (GB)

(72) Inventor: Jonathan Peter Buckland, Inverurie (GB)

(73) Assignee: Circulate Plus Limited, Inverurie (GB)

( * ) Notice: Subject to any disclaimer, the term of this patent is extended or adjusted under 35 U.S.C. 154(b) by 211 days.

(21) Appl. No.: 17/596,508

(22) PCT Filed: Jun. 10, 2020

(86) PCT No.: PCT/GB2020/051395
§ 371 (c)(1),
(2) Date: Dec. 12, 2021

(87) PCT Pub. No.: WO2020/249940
PCT Pub. Date: Dec. 17, 2020

(65) Prior Publication Data
US 2022/0282593 A1    Sep. 8, 2022

(30) Foreign Application Priority Data
Jun. 13, 2019 (GB) .................................. 1908531

(51) Int. Cl.
*E21B 34/10* (2006.01)
*E21B 34/06* (2006.01)
*F16K 3/26* (2006.01)

(52) U.S. Cl.
CPC .......... *E21B 34/102* (2013.01); *E21B 34/063* (2013.01); *F16K 3/265* (2013.01)

(58) Field of Classification Search
CPC .... E21B 34/063; E21B 34/102; E21B 21/103; E21B 34/08; E21B 34/103; E21B 34/12; E21B 34/14; F16K 3/265
See application file for complete search history.

(56) References Cited

U.S. PATENT DOCUMENTS 3,494,419 A    2/1970   Mullins
3,970,147 A    7/1976   Jessup et al.
(Continued)

FOREIGN PATENT DOCUMENTS

| GB | 2252579 A | 8/1992 |
| GB | 2545919 A | 7/2017 |
| WO | 2017017700 A1 | 2/2017 |

OTHER PUBLICATIONS

International Search Report and Written Opinion, for International Application No. PCT/GB2020/051395, dated Aug. 18, 2020, 13 pages.
(Continued)

*Primary Examiner* — D. Andrews
*Assistant Examiner* — Ronald R Runyan
(74) *Attorney, Agent, or Firm* — Onyx IP Group

(57) ABSTRACT

A circulation valve for a well, with a housing allowing fluid flow with an outlet from the housing and a control sleeve controlling flow through the outlet. A support member supports the control sleeve, closing the outlet when the valve is in compression. The support member is slidable with respect to the control sleeve and disengages from the control sleeve when the valve is in tension, permitting movement of the control sleeve to open the outlet in response to a minimum flow rate through the valve while the valve is in tension.

19 Claims, 6 Drawing Sheets

(56) References Cited

U.S. PATENT DOCUMENTS

| | | | |
|---|---|---|---|
| 4,520,870 A * | 6/1985 | Pringle | E21B 34/14 |
| | | | 166/239 |
| 5,048,611 A | 9/1991 | Cochran | |
| 7,322,419 B2 | 1/2008 | Carmichael | |
| 7,434,625 B2 | 10/2008 | Adams | |
| 7,703,533 B2 | 4/2010 | Ashy et al. | |
| 7,934,559 B2 | 5/2011 | Posevina et al. | |
| 8,672,036 B2 | 3/2014 | Hughes et al. | |
| 2005/0217864 A1 | 10/2005 | Carmichael | |
| 2006/0011354 A1 | 1/2006 | Logiudice et al. | |
| 2011/0284232 A1 | 11/2011 | Huang | |
| 2018/0202247 A1 | 7/2018 | Johnson et al. | |

OTHER PUBLICATIONS

Search Report, for Great Britain Application No. 1908531.5, dated Nov. 21, 2019, 3 pages.

* cited by examiner

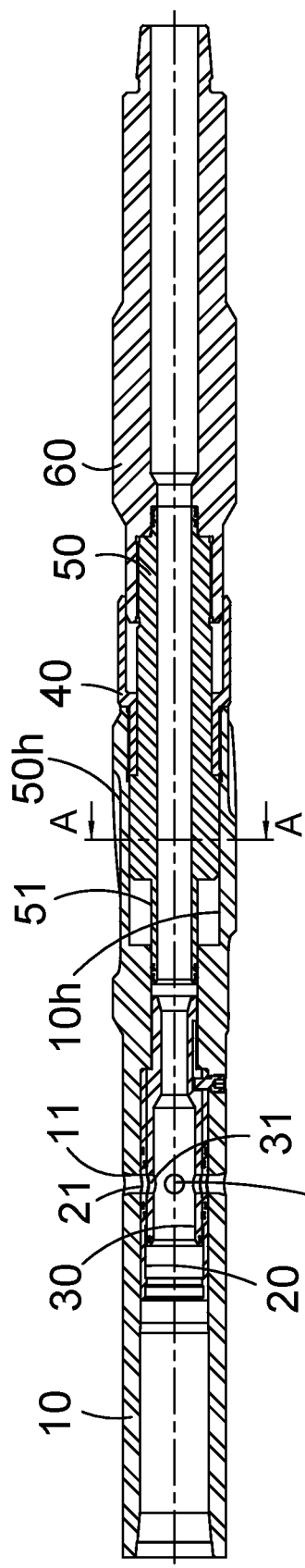
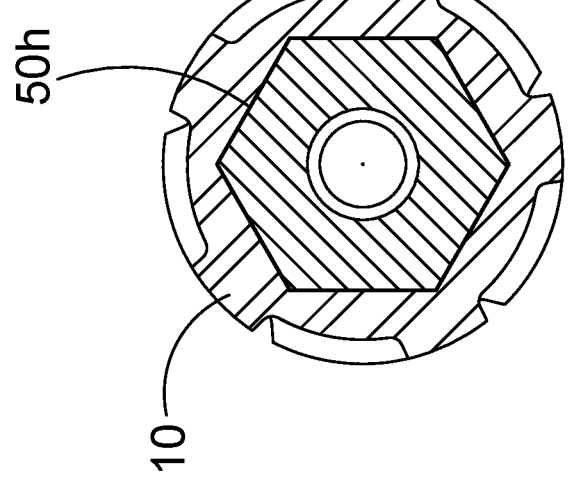
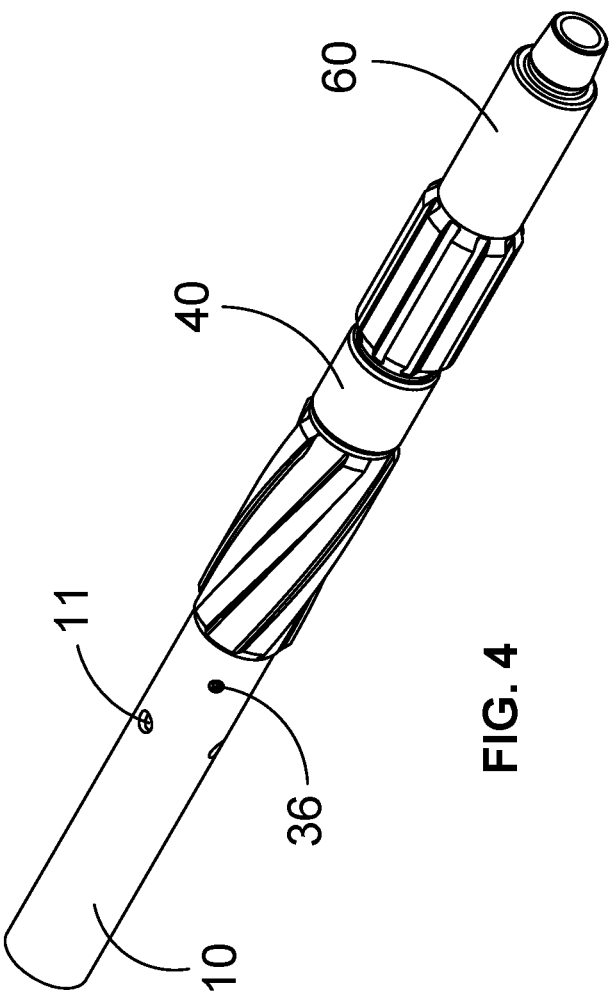

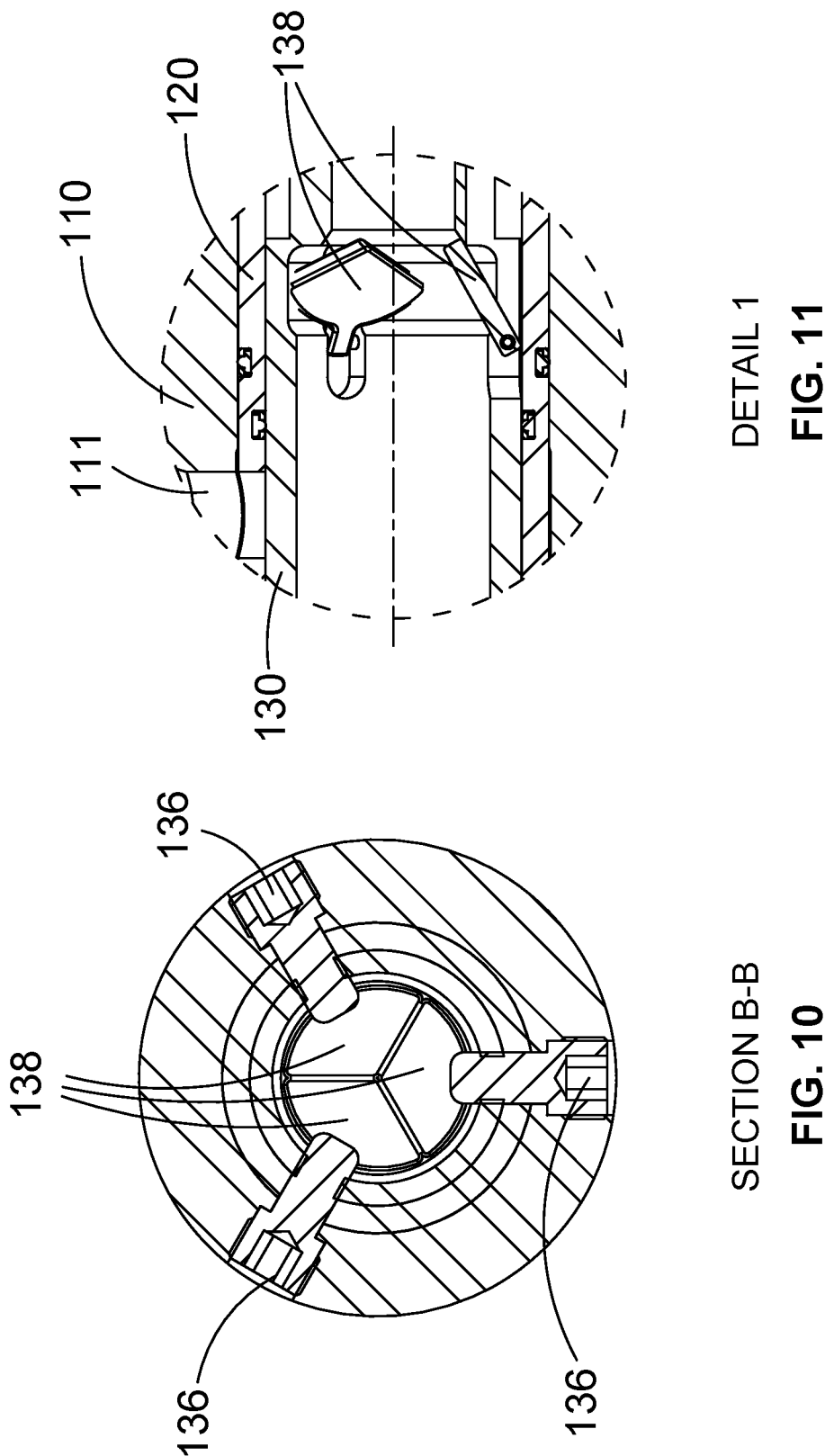

DETAIL 1

SECTION B-B

SECTION A-A

CIRCULATION VALVE

RELATED APPLICATIONS

This application is a 371 national stage of PCT Application Number PCT/GB2020/051395 filed on Jun. 10, 2020, entitled "CIRCULATION VALVE," which claims priority to GB Patent Application No. 1908531.5, filed on Jun. 13, 2019, entitled "CIRCULATION VALVE," all of which are hereby expressly incorporated by reference herein.

The present application relates to a circulation valve for circulating fluid in an oil, gas or water well.

Circulation valves are used in wells to circulate fluid downhole. Circulation valves are generally used to open and close ports connecting the bore of a tubular string in the well, and the annulus surrounding it, to allow fluid passage through the port. This can be useful for fluid injection into the well, for example, during chemical treatments, or for the injection of proppant into a perforation.

Examples of known designs of circulation valves are shown in U.S. Pat. No. 8,672,036, US2005/0217864, U.S. Pat. Nos. 7,434,625, 3,970,147, 5,048,611, US2011/284232, U.S. Pat. No. 3,494,419 and US2018/0202247, which are useful for understanding the invention.

SUMMARY

The present invention provides a circulation valve for a well, the valve having:
- a housing adapted to connect into a tubular string in the well, the housing having a bore for fluid flow and an outlet from the housing connecting the bore to the outer surface of the housing;
- a control sleeve slidable relative to the housing between a first position in which it restricts or prevents fluid flow through the outlet and a second position in which it permits fluid flow through the outlet; and
- a support member adapted to support the control sleeve in the first position;
- wherein the support member keeps the control sleeve in the first position when the valve is in compression;
- and wherein the support member is slidable relative to the control sleeve between an engaged position in which the valve is in compression and the control sleeve engages the support member, and a disengaged position, in which the valve is in tension and the control sleeve is spaced axially away from the support member;
- and wherein when the support member is in the disengaged position, the control sleeve is configured to move from the first position to the second position in response to a minimum flow rate through the bore.

The outlet can thus be opened and closed in response to two-factors, for example, by disengaging the support member from the control sleeve by placing the valve in tension, thereby sliding the support member away from the control sleeve, and by moving the control sleeve relative to the housing in response to the minimum flow rate of fluid through the bore. Examples employing two-factor activation in this way have a reduced risk of premature activation, since the control sleeve does not move until the support member disengages and the flow rate through the bore reaches the minimum required to move the control sleeve. In such examples employing two-factor activation, movement of the support member or high flow rates through the bore individually are insufficient to open the outlet so the valve is less sensitive to random wellbore events such as pressure surges or changes in weight on the string, which alone might inadvertently trigger opening of the outlet.

The outlet is therefore closed while the string is in compression, with weight set down on the bit, for example, during drilling operations, and can then be opened by lifting weight on the bit from the surface, which places the valve in tension and disengages the support member from the control sleeve, separating the support member from the control sleeve within the bore. However, the movement of the support member does not itself open the outlet, as the control sleeve remains in place typically due to the friction retaining it in position within the bore. The control sleeve only moves axially downwards when the flow rate through the bore increases above the minimum, e.g. the minimum flow rate necessary to overcome the friction retaining the control sleeve, causing the control sleeve to slide within the bore of the valve and open the outlet, for example, when an outlet port on the control sleeve is aligned with the outlet on the housing.

Because the outlet does not immediately open when tubular column slides, but requires also the minimum flow rate within the bore to move the control sleeve, examples of the valve have the advantage that they can usefully avoid inadvertent opening when hitting pockets during drilling. A further advantage is that the valve permits the transmission of pressure signals (for example build-up of pressure above a threshold in order to shear pins on a piston) directed at tools below the valve, and therefore allows control of such tools without opening the valve outlet.

The outlet is optionally a radial outlet, connecting the bore with an annulus surrounding the housing in the well. The outlet can comprise a channel extending radially through the housing, opening onto the outer surface of the housing.

Optionally the support member can be in the form of a tubular column or mandrel, optionally with a bore which can be in fluid communication with the bore of the housing. Optionally the support member can slide relative to the housing, optionally within the bore of the housing. Optionally sliding movement of the support member urges the control sleeve back into the first position from the second position.

Optionally the control sleeve can be locked to the housing, optionally with a detent mechanism. Optionally the detent mechanism is adapted to re-engage the housing when the control sleeve is returned from the second position into the first position. Optionally the detent mechanism comprises a resilient member.

Optionally the support member and the control sleeve (and optionally at least a part of the tubular column) are disposed within the bore of the housing.

Optionally the control sleeve incorporates a closure device to close or restrict the bore through the control sleeve, optionally closing the bore of the housing entirely, optionally closing the bore partially, while leaving some fluid communication across the closure device. Optionally the closure device incorporates a flapper. Optionally the closure device incorporates two or more segments which optionally cooperate to close the bore. Optionally the closure device incorporates one or more fluid ports permitting transfer of hydraulic pressure and passage of fluid through the closure device when the bore is closed.

Optionally the control sleeve, housing and support member are separate. Optionally the housing and support member (and optionally the control sleeve) are independently movable, typically in the second position, e.g. the support member is optionally movable relative to the housing.

Optionally the control sleeve is sealed within the bore, resisting fluid transfer through an annulus between the outer surface of the control sleeve and the inner surface of the bore (which may be a part of the housing, or may be an outlet sleeve fixed and sealed within the body of the housing). Optionally more than one seal is provided on the control sleeve, optionally one on each side of an outlet port on the control sleeve. Optionally the seals are resilient seals. Optionally the seals are dynamic seals, and can typically seal the annulus while the control sleeve is sliding axially. Optionally the control sleeve is a friction fit within the bore of the housing (or within the outlet sleeve) and is retained in one axial position relative to the housing by friction, optionally by friction between the seals and the inner surface of the bore (which may be the inner surface of the outlet sleeve, as the case may be) while able to slide within the bore with a close tolerance when the frictional forces retaining the control sleeve in place are overcome. Thus, movement of the support member into the second position frees the control sleeve to move axially within the bore, but movement of the control sleeve typically only occurs once frictional forces retaining it in position are overcome, i.e. by flow rate above the minimum within the bore. The detent may also assist in retaining the control sleeve in an axial position within the bore. Flowing the fluid through the bore below the minimum rate necessary to move the control sleeve typically does not apply sufficient force to the control sleeve to move the control sleeve within the bore of the housing. However, as the flow rate of the fluid within the bore of the housing approaches the minimum threshold, the bore of the control sleeve typically begins to act as a restriction to fluid flow within the bore. At (and above) the minimum flow rate within the bore of the housing, the fluid flow through the restriction of the control sleeve typically creates a pressure differential across the restriction of the control sleeve, in an axial direction along the bore of the housing, which urges the control sleeve axially within the bore of the housing.

Optionally the control sleeve has a tubular structure, with a bore, which can be co-axial with the bore of the housing, permitting fluid to flow through the bore of the control sleeve. Optionally the control sleeve has an outlet connecting the bore of the control sleeve to the outer surface of the control sleeve, permitting fluid within the bore of the housing to flow through the control sleeve outlet.

Optionally the support member comprises a tubular column. Optionally the tubular column is supported by a lower body, and is optionally connected to the lower body. A first end of the support member (optionally the upper end of the tubular column) is optionally received within the bore of the housing. A second end of the support member optionally protrudes from a lower end of the housing. Optionally the housing and the support member are connected telescopically, so that the support member slides axially with respect to the housing, optionally within defined limits of movement. The support member optionally comprises a shoulder which limits the sliding movement of the support member into the housing. The support member optionally comprises a shoulder which limits the sliding movement of the support member out of the housing. Optionally the support member is disposed at a lower end of the housing, and the first end of the support member received within the housing is an upper end of the support member. Optionally the shoulder on the support member is an upwardly facing shoulder which engages a downwardly facing shoulder on the housing to limit the sliding movement of the support member into the housing.

Optionally the valve has at least one drain port connecting an annular area between the outer surface of the second end of the support member and the inner surface of the bore of the housing with an outer surface of the housing, which is useful for draining fluid from the annular area during sliding movement of the support member within the housing. The drain port can be configured to control the rate of sliding of the support member within the housing, so that in some cases, disengaging of support member may not be instantaneous when the valve assembly is in tension.

Optionally the support member has a central bore in fluid communication with the bore of the housing, and optionally co-axial with the bore of the housing.

Optionally the housing comprises an upper body, and the support member comprises a lower body, and wherein the upper and lower bodies are connected together telescopically permitting sliding of the support member relative to the housing, typically when one of the upper and lower bodies moves relative to the other, and wherein opposite ends of the upper and lower bodies are adapted to connect to a tubular string within the well. Optionally the inwardly facing ends of the upper and lower bodies are connected telescopically, and the outwardly facing ends of the upper and lower bodies are adapted to connect to the tubular string within the well. Optionally the upper body is connected to or formed integrally with the housing and moves with the housing, and the lower body is connected to or formed integrally with the support member and moves with the support member.

The present invention also provides a method of circulating fluid in an oil, gas or water wall with a circulation valve, the valve having:

a housing adapted to connect into a tubular string in the well, the housing having a bore for fluid flow and an outlet from the housing connecting the bore to the outer surface of the housing;

a control sleeve slidable relative to the housing between a first position in which the control sleeve restricts or prevents fluid flow through the outlet and a second position in which the control sleeve permits fluid flow through the outlet; and a support member adapted to support the control sleeve in the first position:

wherein the support member keeps the control sleeve in the first position when the housing is in compression;

wherein the method includes applying tension to the valve and sliding the support member relative to the control sleeve from an engaged position in which the support member engages the control sleeve to a disengaged position, in which the valve is in tension and the support member is spaced axially away from the control sleeve; and flowing a fluid though the bore at a minimum flow rate and moving the control sleeve from the first position to the second position in response to the minimum flow rate through the bore when the support member is in the disengaged position.

Optionally the valve can incorporate a locking mechanism to hold the valve in a running in position in which the control sleeve is locked in the first position. For example, the locking mechanism can incorporate at least one frangible member such as a shear pin or ring. Optionally the locking mechanism locks the control sleeve to the housing. Optionally the control sleeve locks the support member to the housing. Optionally in the running in position, at least one of the control sleeve and the support member can be fixed in an intermediate position, e.g. relative to the housing, for example by connecting at least one of the control sleeve and the support member to the housing via the frangible member. An intermediate position for the control sleeve can be between the first and second positions. An intermediate position for the support member can be between the engaged and disengaged position, permitting movement of the control sleeve and/or the support member axially to shear the frangible member and thereafter permit normal sliding of the components. The locking mechanism optionally permits the valve to be run into the well on a string while locked in a chosen starting position (for example any of the positions of the valve or an intermediate position between extremes). This gives the operator the option to have the tool in a set position when running in hole before deliberately unlocking the locking mechanism. For example, varying the tension or compression in the valve from the surface can be used to change the relative positions of the support member and control sleeve in order to shear the frangible member. After disengaging the locking mechanism, the valve can optionally thereafter be used as normal.

Optionally, ports in the valve can incorporate inserts such as nozzles etc. which can optionally be threaded for co-axial connection to the port. The nozzles or inserts can optionally be formed from materials that have a higher degree of corrosion resistance than the material of the housing, control sleeve or support member, which allows the ports that incorporate inserts to resist the effects of fluid erosion from flow through the bore or the port. Optionally inserts can be varied in diameter to choke the exit flow area. Optionally the control sleeve may also incorporate an insert for this purpose on the inside diameter of the control sleeve, which optionally permits further adjustments in the flow required to move the sleeve based on the selected diameter of the chosen insert.

In certain examples, advantages arise from combatting loss of wellbore fluids such as drilling fluid from the well. Some examples permit very rapid operation. For example, when drilling through "thief zones" that are very porous and tend to absorb fluids such as drilling fluid that is circulated into the well, it is common to pump lost circulation materials (LCM) into the formation to stem the losses of fluid through the leaky formation. The combination of features permits the valve to be opened or closed very rapidly in response to surface actions in order to pump LCM into the well. A further advantage arises in the event of wellbore "kicks" (imbalances between fluid pressure in the wellbore and the string), in that in the event of wellbore fluids flowing in an uncontrolled manner out of the drill string the outlet can quickly be closed to help to manage uncontrolled escape of fluids from the well.

In certain examples, the movement of the control sleeve can be controlled from surface, by manipulation of weight on the string as a whole. One advantage of the combination of features is that certain examples are resistant to accidental closure.

In some examples, springs to retain a configuration during run in (required in many conventional tools) are unnecessary and examples can be run into the hole without a requirement to be biased closed or open, and further do not need to be run in while locked in position e.g. to retain a position in a J-slot mechanism. Further, some examples obviate the requirement for hydraulic pressure or fluid flow to keep the valve open, which makes such examples more reliable while simplifying the operational processes downhole.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying Figures. Still other aspects, features, and advantages of the present invention are readily apparent from the entire description thereof, including the Figures, which illustrates a number of exemplary aspects and implementations. The invention is also capable of other and different examples and aspects, and its several details can be modified in various respects, all without departing from the spirit and scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa. Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee. References to "up" or "down" will be made for purposes of description with the terms "above", "up", "upward", "upper", or "upstream" meaning away from the bottom of the well and toward the surface, and "below", "down", "downward", "lower", or "downstream" meaning toward the bottom of the well and away from the surface and deeper into the well, whether the well being referred to is a conventional vertical well or a deviated well and therefore includes the typical situation where a rig is above a wellhead, and the well extends down from the wellhead into the formation, but also horizontal wells where the formation may not necessarily be below the wellhead.

In the description that follows, like parts are marked throughout the specification and drawings with the same reference numerals, respectively. The drawings are not necessarily to scale. Certain features of the invention may be shown exaggerated in scale or in somewhat schematic form, and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

BRIEF DESCRIPTION OF THE DRAWINGS

In the accompanying drawings:

FIG. 3 shows a side sectional view of the FIG. 1 valve in an open configuration when in tension;

FIG. 4 shows a perspective view of the FIG. 1 valve when in compression and closed;

FIG. 5 shows a section view through section line A-A of FIG. 3;

FIG. 10 shows a section view through section line B-B of FIG. 9;

FIG. 11 shows a detailed view of the closure member in FIG. 7;

Figure 1:
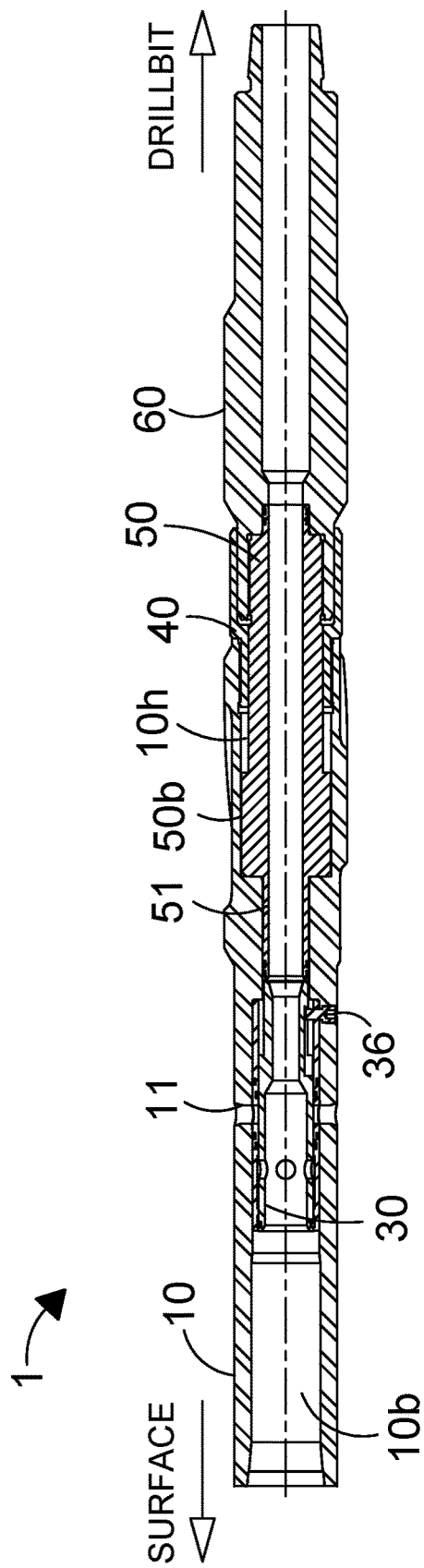
FIG. 1 shows a side sectional view of a first example of a circulation valve in a closed configuration when in compression.

A first example of a circulation valve 1 shown in FIGS. 1-5 has a housing comprising an upper body 10 having a central axial bore 10b that is counterbored and threaded at its lower end to accept the threaded upper end of an optional intermediate sleeve 40. The "upper" end of the valve 1 that is closest to the surface in the well is on the left hand side of the drawings, and the "lower" end is on the right hand side. The skilled reader will appreciate that "upper" and "lower" are useful non limiting designations that are not intended to limit the present disclosure to exclude e.g. horizontal wells where the drill bit is not below the wellhead. The intermediate sleeve 40 in this example typically connects by a thread to the lower end of the upper body 10, so that the two components are rigidly connected together to move as one piece, and so that the bore 10b of the upper body 10 is coaxial with the bore of the intermediate sleeve 40.

The outer surface of the upper body optionally has helical vanes 12 (best shown in FIG. 4) which extend around the outer surface of the upper body 10, defining channels between adjacent vanes 12 to permit fluid passage through the channels. The vanes can provide a standoff between the outer surface of the upper body 10 and the inner surface of the wellbore, which can be casing. Above the threaded surface on the lower end of the bore, a section of the bore 10h can optionally have a non-circular cross section, as best shown in FIG. 5.

The lower end of the bore of the intermediate sleeve 40 has an enlarged bore with a wider diameter than the upper end of the intermediate sleeve 40, and the upper body 10 and intermediate sleeve 40 receive within their co-axial bore a support member in a sliding fit, such that the support member can slide axially within the bore of the housing. The support member in this example comprises a tubular column 50, which in this example is attached to the upper end of an optional lower body 60, for example, by a screw thread, so that the lower body 60 and tubular column 50 are rigidly connected together to move as one piece relative to the housing formed by the upper body 10 and intermediate sleeve 40.

The components of the tubular column, intermediate sleeve, and upper and lower bodies are assembled by inserting a slim (optionally tubular) upper end 51 of the tubular column 50 into a lower end of the bore of the upper body 10. The tubular column 50 optionally has a non-circular outer surface on one section 50h to cooperate with the non-circular section of the bore 10h. When the non-circular sections 50h and 10h are axially aligned and the tubular column section 50h is disposed within the upper body section 10h as shown in the figures, torque can be transmitted across the valve 1, from the surface to e.g. a drill bit below the valve 1, which is useful in rotary drilling operations. The non-circular section 50h typically has a larger diameter than adjacent sections of the tubular column 50.

The intermediate sleeve 40 (surrounding the lower end of the tubular column 50) is connected to the lower end of the bore 10b of the upper body typically via a screw thread which can optionally be located immediately below the non-circular section 10h. The bore of the intermediate sleeve 40 slides freely over a lower end section of the tubular column 50 below the non-circular section 50h. The lower end section optionally has a circular cross section, and a narrower diameter arranged to fit into the bore of the intermediate sleeve 40. When connected by the screw thread to the lower end of the upper body, the upper end of the intermediate sleeve 40 optionally provides a shoulder which extends radially into the bore 10b below the non-circular section 50h, and upon assembly this limits the sliding movement of the tubular column out of the bore 10b, since the shoulder on the intermediate sleeve 40 has a narrower inner diameter than the non-circular section 50h of the tubular column.

The lower end of the intermediate sleeve 40 can receive the upper end of the lower body 60 within its larger diameter bore, and the lower body can then be connected to the tubular column via e.g. a screw thread between the inner surface of the upper end of the lower body 60 and the outer surface of the lower end of the tubular column 50. Once connected the tubular column 50 and lower body 60 are adapted to slide as a unitary support member relative to the housing comprising the intermediate sleeve 40 and the upper body 10.

Optionally the tubular column 50 can be inserted first into the bore of the upper body 10, and the intermediate sleeve can then be slid over the lower end of the tubular column before making up the threaded connection between the upper end of the intermediate sleeve 40 and the lower end of the upper body 10. Alternatively, the intermediate sleeve 40 can be slid over the lower end of the tubular column 50, and then the upper end of the tubular column can be offered to the bore of the upper body. In either event, the connection between the lower body 60 and the tubular column is typically made up after the intermediate sleeve 40 is in place between them, since the intermediate sleeve 40 cannot slide over the larger diameter vanes on the outer surface of the lower body 60.

The outer surface of the slim upper end 51 of the tubular column 50 is optionally tubular, and a central bore continuous with the central bore 10b typically extends through the components. The tubular column 50 and lower body 60 together form a support member, which slides relative to the housing comprising the upper body 10 and intermediate sleeve 40. The skilled person will appreciate that the support member and housing can be single piece components in other examples, or can be constructed from multiple pieces as required, and that the two-piece arrangement and order of assembly as described here is merely for convenience of assembly.

The upper body 10 has at least one outlet 11 extending radially through a wall, and in most examples will have a circumferentially spaced array of outlets 11 at a common axial location along the axis X-X of the valve 1, to permit fluid communication within the central bore 10b and the outside of the valve 1.

The upper end of the upper body 10 is counterbored, having an upwardly extending shoulder within the bore 10b. The upwardly facing shoulder supports the lower end of an optional outlet sleeve 20, which can optionally be pinned or otherwise secured into the body 10, and which has a bore that is coaxial with the bore 10b, and outlets coincident with the outlets 11 in the upper body 10. The outlet sleeve can be replaced when the outlets of the outlet sleeve 20 suffer erosion damage through outflow of fluid, typically before damage occurs to the outlets 11 in the upper body 10. In some examples, the outlet sleeve can be omitted. In examples where the outlet sleeve is provided, the bore of the outlet sleeve is effectively performing the function of the bore 10b. The outlet sleeve 20 has one or more outlets 21 corresponding with the outlets 11 in the upper body 10, and aligned therewith. Optional seals can be mounted on the outlet sleeve 20 e.g. above and below the outlets 11, 21.

A control sleeve 30 is a sliding fit within the bore of the outlet sleeve 20 and can slide axially within the bore of the outlet sleeve 20 (i.e. within the bore 10b) between first and second positions. The control sleeve has a lower end with a slim cylindrical profile received within a narrow central section 10c of the body 10. There is a downwardly facing shoulder on the outer surface of the control sleeve 30 between the upper and lower ends. Seals on the inner surface of the outlet sleeve 20 are compressed between the outlet sleeve and the outer surface of the control sleeve.

A trio of pins 36 optionally extend through the outer wall of the upper body 10 immediately above the central section of the bore 10c. The inner ends of the pins 36 optionally engage within axial slots on the outer surface of the control sleeve 30, and this arrangement preserves rotational alignment of the control sleeve as it slides axially within the bore 10b, and optionally serves to limit the sliding movement of the control sleeve 30 in both directions.

The first position of the control sleeve is shown in FIG. 1, closer to the upper end of the upper body 10, and the second position is shown in FIG. 3. In the first position, the lower end of the control sleeve 30 is just entering the narrow central region 10c, but the downwardly extending shoulder on the outer surface of the control sleeve is spaced away from the central section 10c, the pins 36 are at the bottom end of the slots, and there is no fluid pathway open except through the bore of the control sleeve, so the valve is closed. In the second position, the lower end of the control sleeve 30 is fully received in the narrow central region of the bore 10b, the pins 36 are at the upper end of the slots, and the downwardly facing shoulder on the outer surface of the control sleeve 30 has landed on an upwardly facing shoulder on the inner bore 10b of the upper body 10, located below the upwardly facing shoulder that supports the outlet sleeve 20. With the shoulders engaged and pins 36 at the upper ends of the slots as shown in FIG. 3, the control sleeve 30 cannot slide down any further, and the outlets 11, 21, 31 in the body 10, outlet sleeve 20 and control sleeve 30 are all in alignment, opening a flow path for fluid between the centre of the bore 10b and the outside of the valve 1, as best shown in FIG. 3.

FIG. 1 shows the valve 1 in the closed position, used optionally for drilling, where weight is kept on the bit from above, and the string is in compression, thus pushing the lower body 60 and tubular column 50 up into the bore of the intermediate sleeve 40 and upper body 10 as shown in FIG. 1. This pushes the upper end 51 of the tubular column 50 up into the narrow central section 10c of the bore 10b, where it engages the lower end of the control sleeve 30, and pushes the control sleeve 30 up the bore 10b into the first position, thus moving the outlets 31 out of alignment with the fixed outlets 11, 21. In this closed configuration, seals that are associated with outlets 11, 21 (optionally disposed on respective outer and inner surfaces of the outlet sleeve 20) deny fluid flow out of the bore 10b except through the ends of the control sleeve 30. During drilling, when the weight is kept on the bit, the string and thus the valve 1 will be in compression, and the valve 1 will adopt the FIG. 1 configuration, with the outlets closed, and the tubular column 50 supporting the control sleeve 30.

Figure 2:
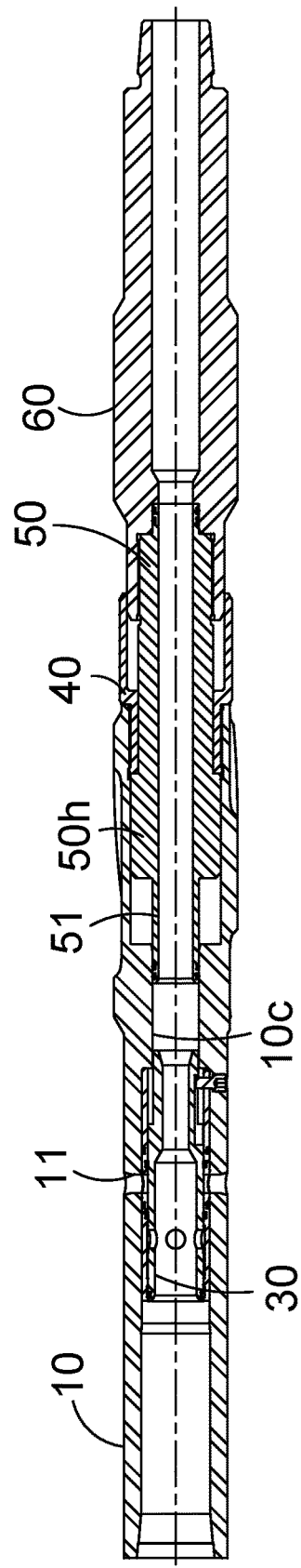
FIG. 2 shows a side sectional view of the FIG. 1 valve in a closed configuration when in tension.

When the operator wishes to circulate fluid through the outlet 11, weight on the string is picked up from the surface, thus placing the string and therefore the valve 1 in tension, and causing the upper body 10 and intermediate sleeve 40 to slide up relative to the lower body 60 and tubular column 50 as shown in FIG. 2, causing the upper narrow part 51 of the tubular column 50 to move down the narrow central portion 10c of the upper body 10, such that it no longer supports the control sleeve 30 from below. This allows the control sleeve 30 to move down the bore 10b between the positions shown in FIG. 2 and FIG. 3. The extent of upward sliding of the upper body relative to the lower body is limited by the lower end of the non-circular section 50h abutting a shoulder formed by the upper end of the intermediate sleeve, which juts radially into the bore below the larger diameter non-circular cross section 50h, as shown in FIG. 2.

Optionally, the intermediate sleeve 40 can be furnished with drainage channels, permitting fluid to drain from the annulus between the intermediate sleeve 40 and the tubular column 50, so as to resist the tendency for hydraulic lock of the tubular column 50 within the bore 10b.

Optionally, the control sleeve 30 can incorporate a locking mechanism in this example in the form of a detent 32 at its upper end (see FIG. 6) which fixes the control sleeve in a static location relative to the outlet sleeve 20, in the FIG. 1 position. The detent 32 is radially compressed against the inner surface of the bore of the outlet sleeve 20, and engages a circumferential shoulder 22 at the top end of the bore which protrudes radially inwards into the bore 10b, below the detent 32 in its FIG. 1 position. The outwardly protruding detent 32 is typically resilient, and can deform radially inwards to squeeze past the shoulder 22 when the control sleeve 30 is subjected to an axial force generated by a minimum flow rate of fluid through the bore 10b. The detent 32 can have various different values of resilience, and can thus be selectively set to escape the shoulder at different forces; optionally the detent can be a relatively low force, which can be determined in conjunction with the minimum flow rate desired to open the valve. Optionally the release value of the detent can be determined solely based on the desired flow rate of fluid through the bore 10b required to open the valve; so in certain examples, it is not necessary to take into account other factors of other components such as spring rates etc.

Figure 6:
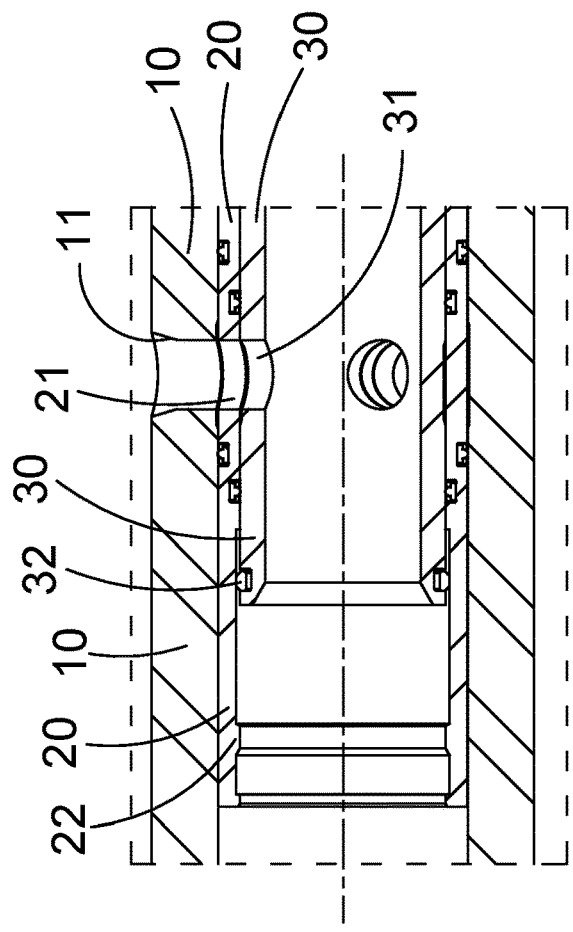
FIG. 6 shows a close up view of the control sleeve in FIG. 3.

When the valve 1 is placed in tension, by removing weight on the string and allowing the weight of the string beneath the valve 1 to draw the lower body 60 downwards from the upper body 10, the lower body 60 pulls the tubular column out of the upper body 10, removing the support beneath the control sleeve 30 as shown in FIG. 2. At this stage, the detent 32 remains engaged, holding the weight of the control sleeve 30 in place, to lock the control sleeve 30 to the outlet sleeve in the FIG. 2 position despite the removal of the support from the tubular column 50. Fluid can then be flowed through the bore 10b to generate a pressure differential across the control sleeve 30, to overcome the force of the detent 32 locked behind the shoulder 22 when the flow rate reaches a minimum threshold. When the detent releases as shown in FIG. 6, the control sleeve 30 slides downwards in the bore 10b under the force of the flow of fluid into the FIG. 3 position, thereby aligning the outlets 11, 21, 31, and opening the valve.

The valve can easily be closed and returned to the FIG. 1 position by setting weight down on the string, for example on the drill bit, so that the narrow upper portion 51 of the tubular column 50 rises up within the central section 10c of the bore 10b, pushing the control sleeve 30 back up into the FIG. 1 position, and re-engaging the detent 32 above the shoulder 22, locking the control sleeve 32 the outlet sleeve 20 in the FIG. 1 position once more.

This permits the valve to operate repeatedly for an infinite number of times, without reliance on spring force, which is a significant advantage, because it permits the detent 32 to be designed without consideration of the spring force to be overcome when opening the valve up. The valve 1 can also operate repeatedly without requirement for resetting at the surface, for example, to remove balls from a ball catcher or replace shear pins. The amount of force required to overcome the detent can be set with respect to the pumping force used for circulation operations, so can be adjusted readily to suit different flow rates in different wells, again without affecting other tools in the string.

The sliding movement of the upper body 10 relative to the tubular column 50 and lower body 60 can optionally be controlled by viscous fluid in the annulus between them, to prevent inadvertent withdrawal of the narrow section 51 of the tubular column 50 from below the control sleeve 30 in the event of drilling through unexpected pockets within the substrate, or to slow down the rate of withdrawal.

Referring now to FIGS. 7-11, a second example of a circulation valve is described having features in common with the first example described above. In the second example, the valve 101 has upper and lower bodies 110, 160 with a bore 110b, and an intermediate sleeve 140 and tubular column 150 with a slim upper section 151 as previously described for the first example, as well as outlets 111, 121, 131 and an outlet sleeve 120. In the second example, the only difference is that the control sleeve 130 incorporates an optional closure device within the bore of the control sleeve 130. In this example the closure device optionally takes the form of a flapper 138. While a single piece flapper can be used as a closure device in different examples, the flapper 138 in this example is a multipart flapper having either two, or as shown here, three separate segments pivotally mounted on the control sleeve to move between open configurations shown in FIGS. 7 and 8, and a closed configuration shown in FIG. 9. The flapper is used to open and close the bore of the control sleeve 130. Typically the flapper is disposed at the lower end of the control sleeve, below the outlet 131.

Figure 7:
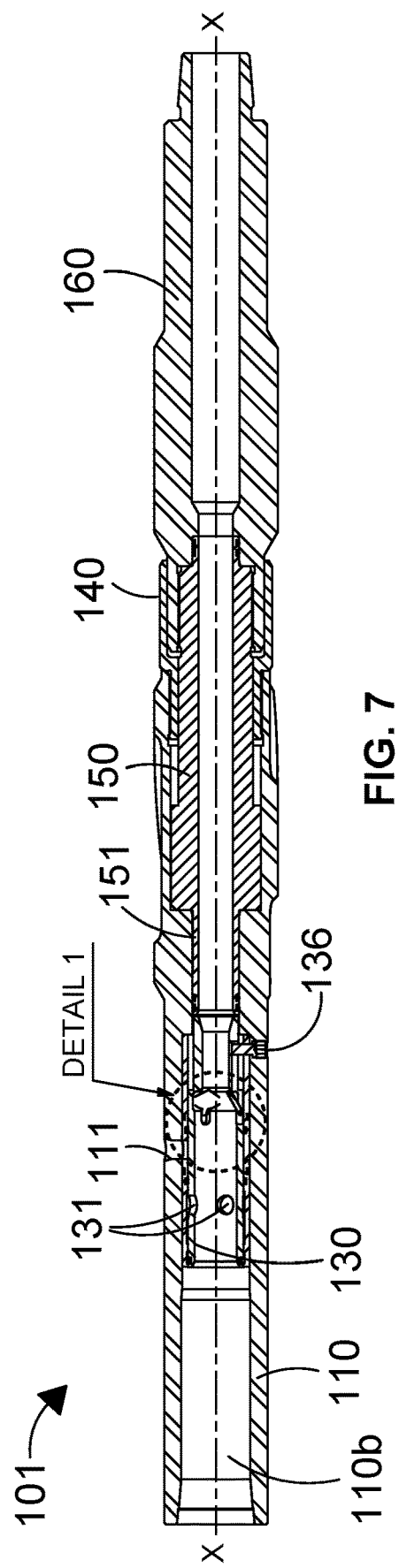
FIG. 7 shows a side sectional view of a second example of a circulation valve in a closed configuration when in compression.

In the FIG. 7 configuration, where the valve 101 is in compression, for example during a drilling operation, the narrow section 151 of the support member comprising the tubular column 150 extends upwards into the narrow central section 110c of the bore, and holds the control sleeve 130 in its first configuration with the outlet closed. The pins 136 extend into the slots on the outer surface of the narrow section at the lower end of the control sleeve 130 as previously described.

Figure 8:
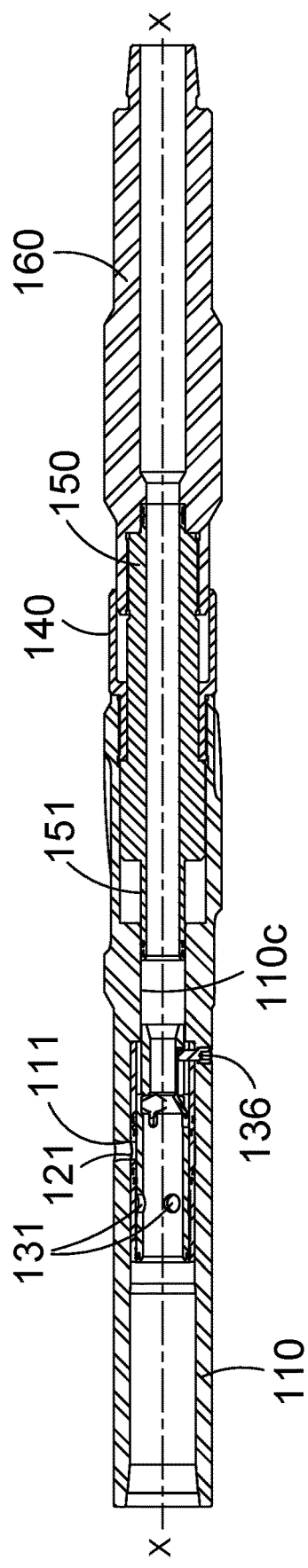
FIG. 8 shows a side sectional view of the FIG. 7 valve in a closed configuration when in tension.
Figure 9:
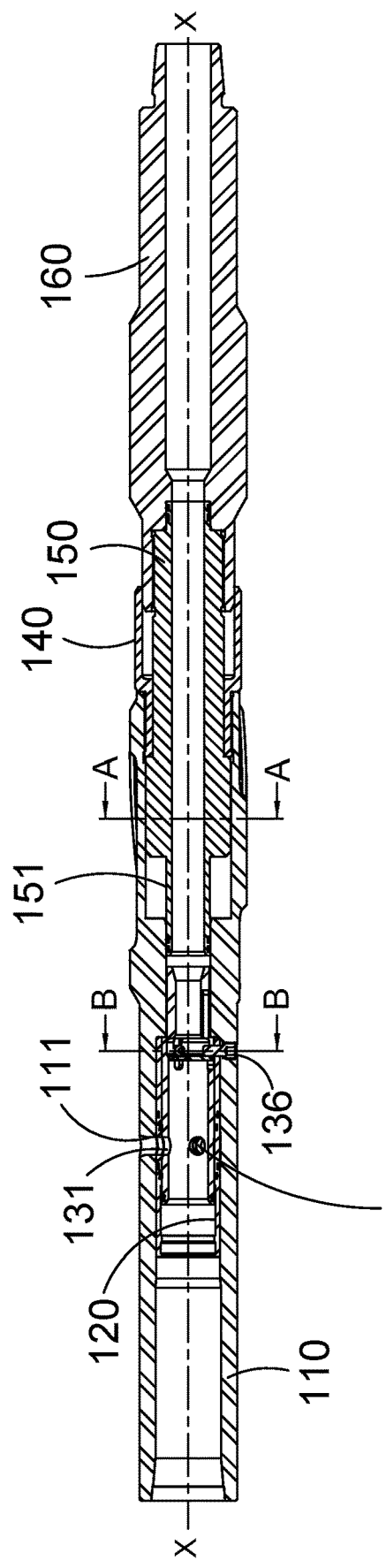
FIG. 9 shows a side sectional view of the FIG. 7 valve in tension, with the valve open.

Once the string is in tension as shown in the FIG. 8 configuration, and the minimum flow rate of fluid through the bore 110b has pushed the control sleeve 130 downwards so that the narrow lower portion of the control sleeve 130 extends fully into the narrow central section 110c of the bore, the inner ends of the pins 136 have travelled up the slots on the outer surface of the lower part of the control sleeve 130 until they engage the lower surfaces of the flap segments 138, thereby pushing them into the horizontal closed position which occludes the bore of the control sleeve 130. This configuration is shown in FIG. 9, and in this arrangement, the bore through the control sleeve 130 is closed, thereby diverting all of the fluid entering the upper end of the control sleeve 130 through the aligned outlets 111, 121, 131.

When the string is once again in compression, and the narrow upper section 151 of the tubular column 150 rises within the central section 110c of the bore to push the control sleeve 130 upwards, the inner ends of the pins 136 have travelled down the slots to the lower end thereof, disengaging from the lower surface of the flaps 138, and allowing them to pivot to their open positions as shown in FIGS. 7 and 8. FIGS. 10 and 11 show detailed views of the configuration of the valve with the flappers closed (in FIG. 10) and open (in FIG. 11).

Figure 14:
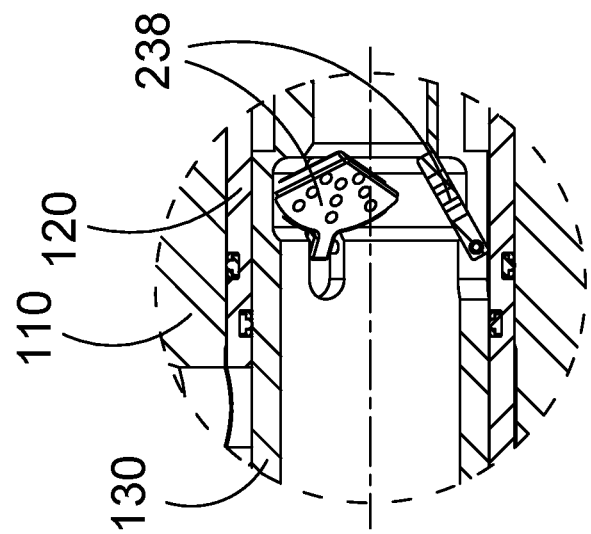
FIGS. 12-14 show plan sectional views similar to FIGS. 5, 10 and 11 illustrating an optional modification to the FIG. 7 valve.
Figure 13:
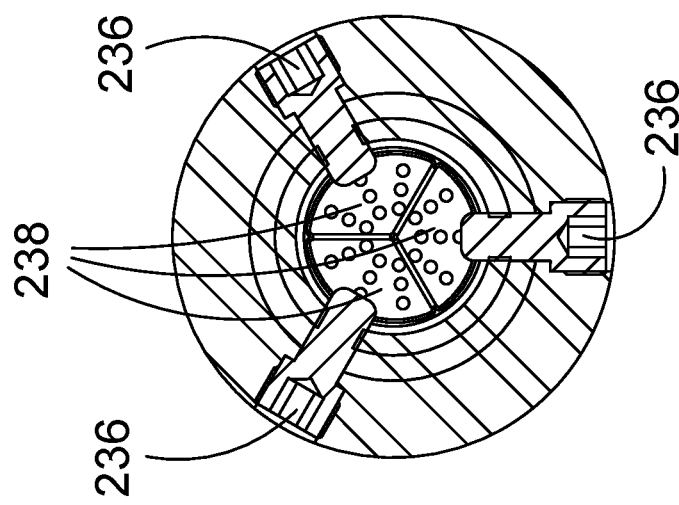
Figure 12:
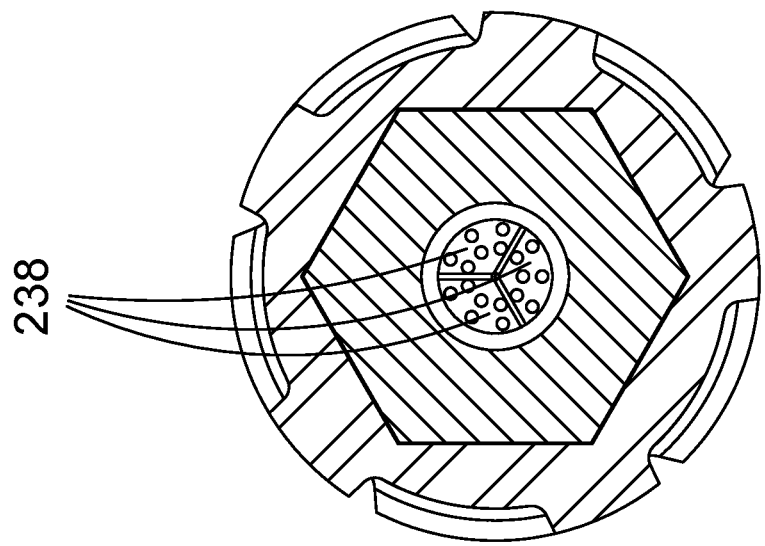

In one possible modification of the second example, the flap segments 238 can optionally be perforated with holes or slots or other fluid channels as shown in FIGS. 12-14, but can operate in substantially the same way as described for the second example, supported from beneath by the ends of pins 236. Provision of fluid channels in the flapper permits some fluid communication across the flapper which can be useful to transmit fluid pressure signals across the flapper in some examples, for example, permitting the transmission of fluid signals via fluid pressure in the bore to tools lower down in the string.

The invention claimed is:

1. A circulation valve for a well, the valve having:
   a housing adapted to connect into a tubular string in the well, the housing having a bore for fluid flow and an outlet from the housing connecting the bore to the outer surface of the housing;
   a control sleeve slidable relative to the housing between a first position in which it restricts or prevents fluid flow through the outlet and a second position in which it permits fluid flow through the outlet; and
   a support member adapted to support the control sleeve in the first position;
   wherein the support member keeps the control sleeve in the first position when the valve is in compression;
   wherein the housing comprises an upper body, and the support member comprises a lower body, and wherein the upper and lower bodies are connected together telescopically permitting sliding of the support member relative to the housing when one of the upper and lower bodies moves relative to the other, and wherein opposite ends of the upper and lower bodies are adapted to connect to a tubular string within the well;
   and wherein the support member is slidable relative to the control sleeve between an engaged position in which the valve is in compression and the control sleeve engages the support member, and a disengaged position, in which the valve is in tension and the control sleeve is spaced axially away from the support member;
   and wherein when the support member is in the disengaged position, the control sleeve is configured to move from the first position to the second position in response to fluid flow through the bore reaching a minimum flow rate.

2. The circulation valve as claimed in claim 1, wherein the support member comprises a tubular column with a bore which is in fluid communication with the bore of the housing.

3. The circulation valve as claimed in claim 1, wherein sliding movement of the support member from the disengaged position to the engaged position moves the control sleeve from the second position into the first position.

4. The circulation valve as claimed in claim 1, including a detent mechanism adapted to selectively resist movement of the control sleeve relative to the housing, wherein the detent mechanism is adapted to engage the housing and to resist relative movement of the housing and control sleeve when the control sleeve is in the first position.

5. The circulation valve as claimed in claim 4, wherein the detent mechanism is resilient and is adapted to disengage from the housing when the control sleeve is moved from the first position to the second position, and to re-engage the housing when the control sleeve is moved from the second position into the first position.

6. The circulation valve as claimed in claim 1, including a locking mechanism adapted to lock at least one of the control sleeve and the support member in a fixed position relative to the housing during running into the hole, and wherein the locking mechanism comprises a frangible member adapted to be disrupted to release the locking member following running into the hole.

7. The circulation valve as claimed in claim 1, wherein the control sleeve, housing and support member are separate and wherein the support member and the control sleeve are independently movable relative to the housing.

8. The circulation valve as claimed in claim 1, wherein the control sleeve is sealed within the bore of the housing by at least one seal, resisting fluid transfer through an annulus between the outer surface of the control sleeve and the inner surface of the bore of the housing.

9. The circulation valve as claimed in claim 1, wherein the control sleeve incorporates a bore with an outlet port connecting the bore of the control sleeve with an outer surface of the control sleeve, and wherein at least one seal is provided on each side of the outlet port of the control sleeve.

10. The circulation valve as claimed in claim 1, wherein the control sleeve incorporates a closure device adapted to close or restrict the bore of the housing.

11. The circulation valve as claimed in claim 10, wherein the closure device incorporates one or more fluid ports permitting transfer of hydraulic pressure and passage of fluid through the closure device when the bore is closed by the closure device.

12. The circulation device as claimed in claim 10, wherein the closure device incorporates at least two segments which cooperate to close the bore.

13. The circulation valve as claimed in claim 1, wherein the upper body is configured to move with the housing, and the lower body is configured to move with the support member.

14. The circulation valve as claimed in claim 1, wherein the support member has a first end and a second end, and at least one drain port connecting an annular area between the outer surface of the second end of the support member and the inner surface of the bore of the housing with an outer surface of the housing.

15. A method of circulating fluid in an oil, gas or water wall with a circulation valve, the valve having:
   a housing adapted to connect into a tubular string in the well, the housing having a bore for fluid flow and an outlet from the housing connecting the bore to the outer surface of the housing;
   a control sleeve slidable relative to the housing between a first position in which the control sleeve restricts or prevents fluid flow through the outlet and a second position in which the control sleeve permits fluid flow through the outlet; and
   a support member adapted to support the control sleeve in the first position;
   wherein the support member keeps the control sleeve in the first position when the housing is in compression;
   wherein the method includes applying tension to the valve and sliding the support member relative to the control sleeve from an engaged position in which the support member engages the control sleeve to a disengaged position, in which the valve is in tension and the support member is spaced axially away from the control sleeve; and
   flowing a fluid though the bore at a minimum flow rate and moving the control sleeve from the first position to the second position in response to the minimum flow rate through the bore when the support member is in the disengaged position.

16. The method as claimed in claim 15, including moving the support member from the engaged position to the disengaged position by picking up weight on the tubular string.

17. The method as claimed in claim 15, including moving the control sleeve from the second position into the first position by placing the valve into compression and sliding the support member from the disengaged position to the engaged position.

18. The method as claimed in claim 15, wherein the control sleeve is a friction fit within the bore of the housing and is retained in one axial position relative to the housing by friction while able to slide within the bore of the housing with a close tolerance when the frictional forces retaining the control sleeve in place are overcome, and wherein the minimum flow rate necessary to move the control sleeve is sufficient to overcome the frictional forces retaining the control sleeve within the bore.

19. A circulation valve for a well, the valve having:
- a housing adapted to connect into a tubular string in the well, the housing having a bore for fluid flow and an outlet from the housing connecting the bore to the outer surface of the housing;
- a control sleeve slidable relative to the housing between a first position in which it restricts or prevents fluid flow through the outlet and a second position in which it permits fluid flow through the outlet; and
- a support member adapted to support the control sleeve in the first position;
- wherein the support member keeps the control sleeve in the first position when the valve is in compression;
- and wherein the support member is slidable relative to the control sleeve between an engaged position in which the valve is in compression and the control sleeve engages the support member, and a disengaged position, in which the valve is in tension and the control sleeve is spaced axially away from the support member;
- and wherein when the support member is in the disengaged position, the control sleeve is configured to move from the first position to the second position in response to fluid flow through the bore reaching a minimum flow rate,
- wherein the support member comprises a tubular column with a bore which is in fluid communication with the bore of the housing,
- wherein sliding movement of the support member from the disengaged position to the engaged position moves the control sleeve from the second position into the first position,
- wherein the control sleeve, housing and support member are separate and wherein the support member and the control sleeve are independently movable relative to the housing,
- wherein the housing comprises an upper body, and the support member comprises a lower body, and wherein the upper and lower bodies are connected together telescopically permitting sliding of the support member relative to the housing when one of the upper and lower bodies moves relative to the other, and wherein opposite ends of the upper and lower bodies are adapted to connect to a tubular string within the well.

* * * * *